(12) United States Patent
Cross et al.

(10) Patent No.: US 7,901,486 B2
(45) Date of Patent: Mar. 8, 2011

(54) REMOVAL OF HEAVY METALS FROM HYDROCARBON GASES

(75) Inventors: Joseph B. Cross, Bartlesville, OK (US);
John M. Hays, Bartlesville, OK (US);
Roland Schmidt, Bartlesville, OK (US);
Vidyadhar Y. Katdare, Sugar Land, TX (US)

(73) Assignee: ConocoPhillips Company, Houston, TX (US)

( * ) Notice: Subject to any disclaimer, the term of this patent is extended or adjusted under 35 U.S.C. 154(b) by 275 days.

(21) Appl. No.: 12/244,006

(22) Filed: Oct. 2, 2008

(65) Prior Publication Data
US 2010/0083830 A1 Apr. 8, 2010

(51) Int. Cl.
*B01D 53/64* (2006.01)
*B01D 53/82* (2006.01)
*C10L 3/10* (2006.01)

(52) U.S. Cl. ............ 95/133; 95/144; 95/902; 208/251 R

(58) Field of Classification Search ............... 95/133, 95/134, 900, 902; 96/153; 423/210; 502/64, 502/400; 208/251 R, 253; 585/820
See application file for complete search history.

(56) References Cited

U.S. PATENT DOCUMENTS

| | | | |
|---|---|---|---|
| 2,979,532 A | 4/1961 | MacGregor et al. | |
| 3,194,629 A | 7/1965 | Dreibelbis et al. | |
| 3,239,451 A | 3/1966 | Young | |
| 3,803,803 A | 4/1974 | Raduly et al. | |
| 3,876,393 A | 4/1975 | Kasai et al. | |
| 4,101,631 A | 7/1978 | Ambrosini et al. | |
| 4,474,896 A | 10/1984 | Chao | |
| 4,500,327 A | 2/1985 | Nishino et al. | |
| 4,892,567 A | 1/1990 | Yan | |
| 4,902,662 A | 2/1990 | Toulhoat et al. | |
| 5,064,626 A | 11/1991 | Johnson et al. | |
| 5,190,908 A | 3/1993 | Audeh et al. | |
| 5,223,145 A | 6/1993 | Markovs | |
| 5,242,879 A | 9/1993 | Abe et al. | |
| 5,245,106 A * | 9/1993 | Cameron et al. | 585/823 |
| 5,369,072 A | 11/1994 | Benjamin et al. | |
| 5,516,961 A | 5/1996 | Miller et al. | |
| 5,601,701 A * | 2/1997 | Cameron et al. | 208/251 H |
| 5,607,496 A | 3/1997 | Brooks | |
| 5,672,323 A | 9/1997 | Bhat et al. | |
| 6,136,281 A | 10/2000 | Meischen et al. | |
| 6,136,749 A | 10/2000 | Gadkaree et al. | |
| 6,291,391 B1 | 9/2001 | MacArthur | |
| 6,383,981 B1 | 5/2002 | Blankenship et al. | |
| 7,722,843 B1 * | 5/2010 | Srinivasachar | 423/210 |
| 2002/0043483 A1 | 4/2002 | Leung et al. | |
| 2003/0082085 A1 | 5/2003 | Harada et al. | |
| 2006/0205591 A1 | 9/2006 | Lee et al. | |
| 2008/0184884 A1 | 8/2008 | Jadhav | |

FOREIGN PATENT DOCUMENTS

| | | |
|---|---|---|
| EP | 0745439 A2 | 12/1996 |
| GB | 2122916 A | 1/1984 |
| JP | 06048741 | 2/1994 |
| WO | WO 2007/046822 A2 | 4/2007 |

OTHER PUBLICATIONS

PCT/US2009/059273 International Search Report (Form PCT/ISA/220) dated Jan. 11, 2010.
Samuel Texier, Gilles Berhault, Guy Perot and Fabrice Diehl, "Activation of alumina-supported hydrotreating catalysts by organosulfides of H2S: Effect of the H2S partial pressure used during the activation process", Applied Catalysis A: General, vol. 293, Sep. 28, 2005, pp. 105-119.

* cited by examiner

*Primary Examiner* — Frank M Lawrence

(57) ABSTRACT

A process is disclosed for removing heavy metals from a hydrocarbon gas stream by contacting the hydrocarbon gas stream, which contains a heavy metal and less than 10 ppm oxidizing compounds, with a composition containing a molecular sieve and sulfur resulting in a treated stream containing less heavy metal than the hydrocarbon gas stream; wherein the molecular sieve contains alumina, silica, and iron, and optionally copper and zinc. Optionally, the hydrocarbon gas stream can also contain a sulfur compound.

19 Claims, 3 Drawing Sheets

REMOVAL OF HEAVY METALS FROM HYDROCARBON GASES

BACKGROUND OF THE INVENTION

The invention relates to a process for the removal of heavy metals from a hydrocarbon gas stream. In another aspect, this invention relates to a process for the removal of heavy metals from a hydrocarbon gas stream using a molecular sieve and sulfur composition.

Heavy metals are often contained in natural gas streams and hydrocarbon gas streams produced by gas plants and refineries. These heavy metals include, for example, arsenic, beryllium, lead, cadmium, chromium, nickel, zinc, mercury and barium. Most of these heavy metals are toxic to humans and animals. In particular, lead is thought to compromise the health and mental acuity of young children and fetuses.

Removal of heavy metals from hydrocarbon gas streams is critical for environmental and safety concerns. While a variety of absorbents are available for capture of heavy metals (in particular mercury), these absorbents tend to have low capacities. We have discovered a process using a composition containing a molecular sieve and sulfur which is effective in removing heavy metals from hydrocarbon gas streams.

BRIEF SUMMARY OF THE INVENTION

In accordance with this invention, a process is provided including contacting a hydrocarbon gas stream comprising a heavy metal, which contains less than 10 ppm oxidizing compounds, with a composition comprising a molecular sieve and sulfur resulting in a treated stream containing less heavy metal than the hydrocarbon gas stream; wherein the molecular sieve comprises alumina, silica, and iron.

DETAILED DESCRIPTION OF THE INVENTION

The hydrocarbon gas stream of this invention can be any hydrocarbon gas stream which comprises a heavy metal and less than 10 ppm oxidizing compounds, preferably less than 5 ppm oxidizing compounds, and more preferably less than 3 ppm oxidizing compounds. The hydrocarbon gas stream is typically a natural gas stream or a hydrocarbon gas stream from a gas plant or refinery. More typically, the hydrocarbon gas stream is a natural gas stream.

The heavy metal typically comprises a metal selected from the group consisting of arsenic, beryllium, lead, cadmium, chromium, nickel, zinc, mercury, barium, and combinations of any two or more thereof. The heavy metal most typically comprises mercury.

When the heavy metal is mercury, the mercury is typically present in the hydrocarbon gas stream in an amount in the range of from about 0.1 to about 10,000 $\mu g/m^3$, more typically in the range of from about 1 to about 800 $\mu g/m^3$ and most typically from about 3 to about 700 $\mu g/m^3$.

The hydrocarbon gas stream is contacted with a composition comprising, consisting of, or consisting essentially of a molecular sieve and sulfur, resulting in a treated stream containing less heavy metal than the hydrocarbon gas stream. The molecular sieve preferably comprises, consists of, or consists essentially of alumina, silica, and iron. The molecular sieve can also comprise, consist of, or consist essentially of alumina, silica, iron, copper and zinc.

The sulfur of the composition is preferably in the form of iron sulfide formed by reacting a first sulfur compound with the iron contained in the molecular sieve. The sulfur of the composition can also be in the form of copper sulfide and zinc sulfide formed by reacting the first sulfur compound with copper and zinc, when copper and/or zinc are contained in the molecular sieve. The first sulfur compound is preferably selected from the group consisting of hydrogen sulfide, dimethyldisulfide, and combinations thereof.

The contacting of the hydrocarbon gas stream with the composition is preferably carried out at a temperature in the range of from about 50 to about 150° F., more preferably from about 60 to about 120° F., and most preferably from about 70 to about 110° F.

The hydrocarbon gas stream optionally further comprises at least about 1 ppm, preferably between about 2 and about 20 ppm, and more preferably between about 4 and about 10 ppm of a second sulfur compound selected from the group consisting of hydrogen sulfide, dimethyldisulfide, and combinations thereof.

The treated stream preferably contains less than about 20 weight %, more preferably less than about 10 weight %, and most preferably less than about 5 weight % of the mercury contained in the hydrocarbon gas stream.

The following examples are presented to further illustrate this invention and are not to be construed as unduly limiting its scope.

EXAMPLES

Example 1

Figure 1:
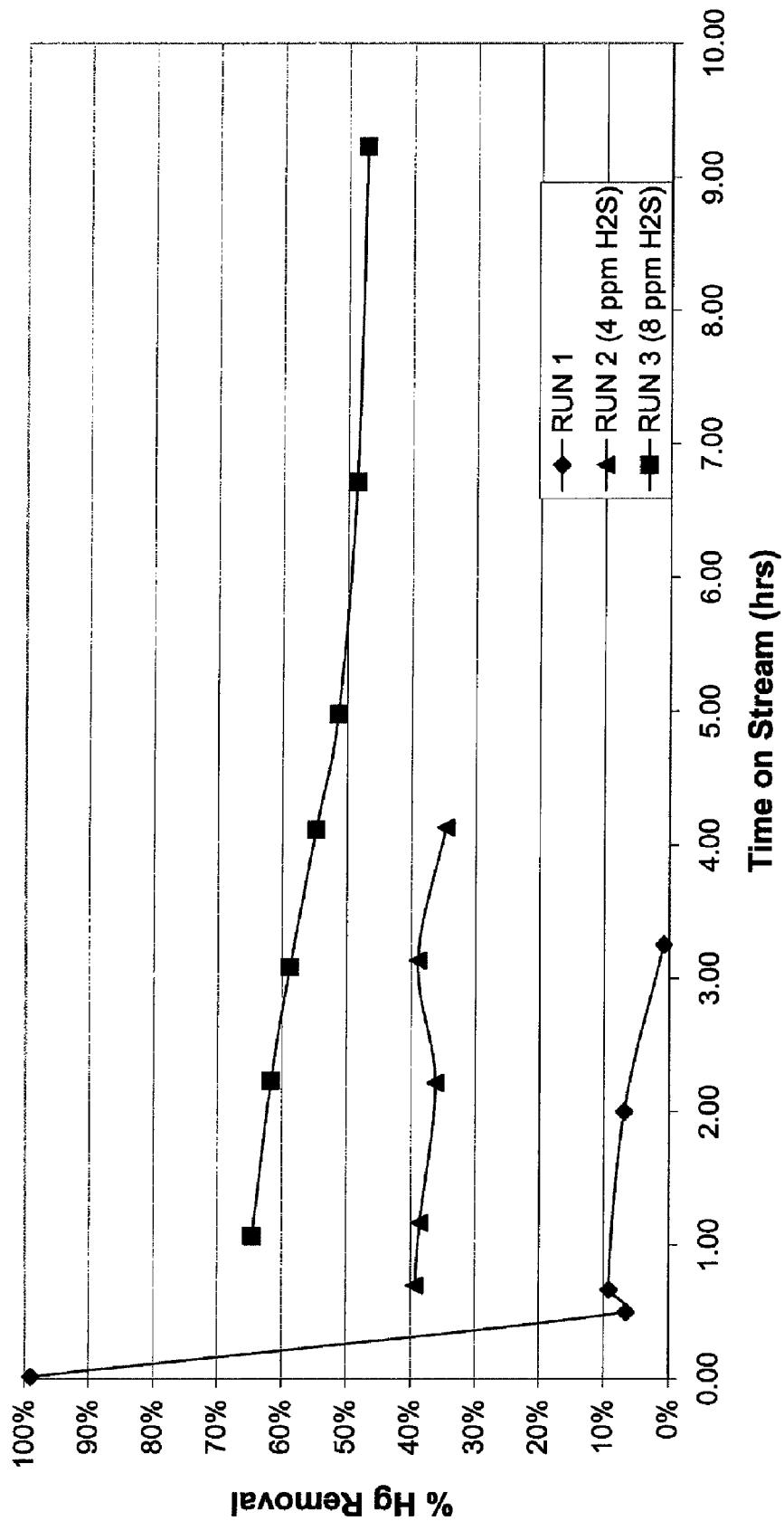
FIG. 1 is a graphic illustration of % Hg Removal vs. Time on Stream data for three runs wherein molecular sieve materials were used to remove $H_2S$ from natural gas.

The percent mercury removal was tested for an AW-500 molecular sieve which contained alumina, silica, iron, copper and zinc. For each Run, a bed of about 5.5 grams of fresh AW-500 molecular sieve were loaded in the contactor, and a natural gas stream containing around 400 $\mu g/m^3$ was passed over the fresh AW-500 at around 72° F. A mercury permeation tube held at a controlled temperature with nitrogen flowing over it provided the source of mercury for the natural gas stream. The $H_2S$ levels for Runs 1, 2 and 3 were held at 0, 4 and 8 ppm, respectively. Results from these runs are shown in FIG. 1, and demonstrate that mercury removal by fresh molecular sieve AW-500 was enhanced with increasing amounts of $H_2S$ present in the natural gas feed.

Example 2

Figure 2:
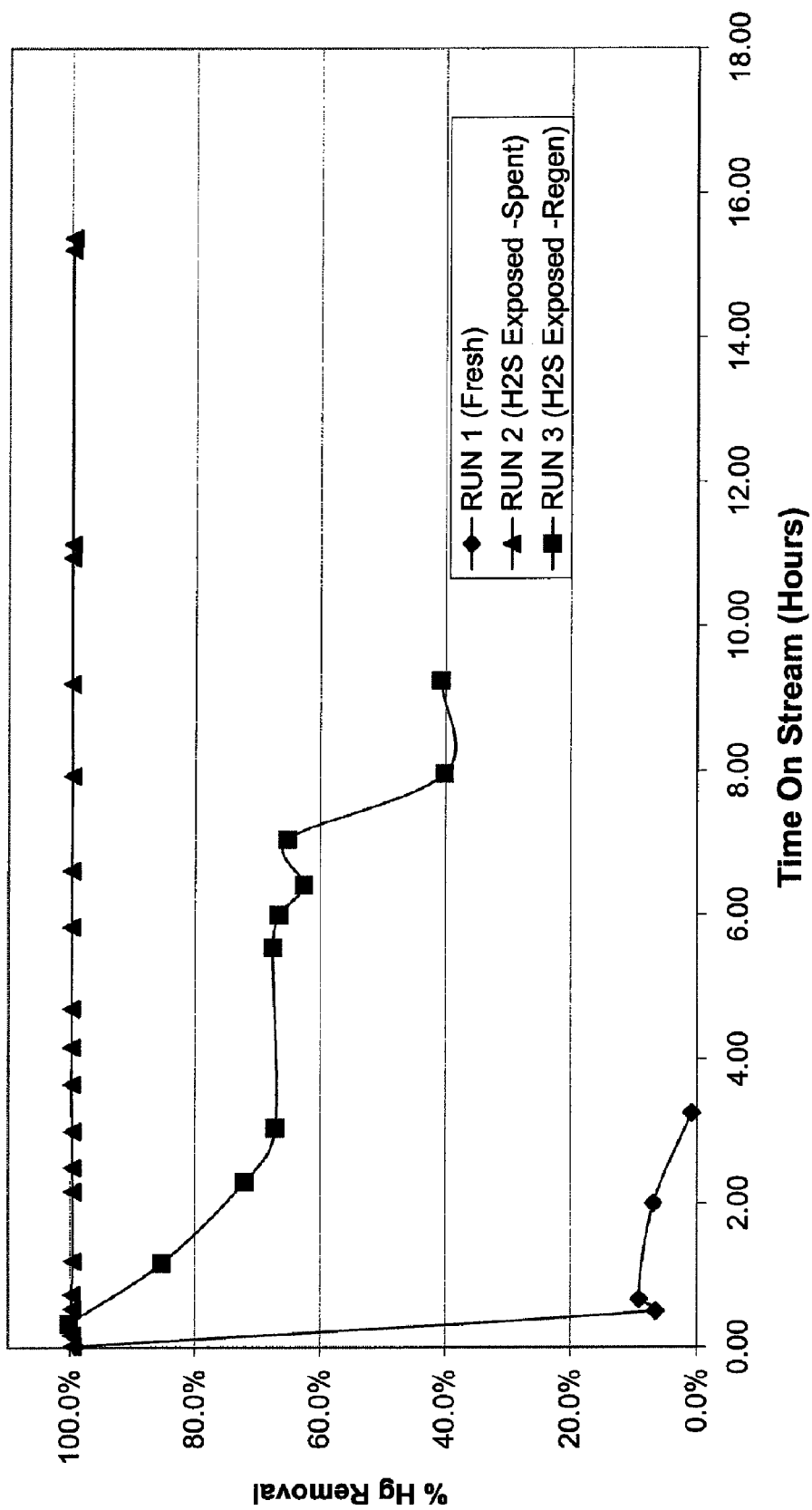
FIG. 2 is a graphic illustration of % Hg Removal vs. Time on Stream data for three runs wherein molecular sieve materials were used to remove $H_2S$ from natural gas.

For each of three runs, around 1 gram of the molecular sieve tested were loaded in the contactor, and a natural gas stream containing around 400 $\mu g/m^3$, and no $H_2S$, was passed over the material at around 72° F. Fresh AW-500 molecular sieve was used for Run 1. For Runs 2 and 3, fresh AW-500 molecular sieve was exposed to a stream of gas containing $H_2S$ until the $H_2S$ broke through the bed. A portion of the resulting material was used in Run 2. A portion of the $H_2S$ saturated AW-500 molecular sieve was regenerated by heating at a temperature of around 500° F. in a dry stream of gas for about 4 hours to remove absorbed $H_2S$, and this material was used in Run 3. Results from these runs are shown in FIG. 2, and demonstrate that the H₂S saturated (spent) AW-500 molecular sieve of Run 2 was significantly better at removing mercury than the fresh AW-500 molecular sieve of Run 1 and was better at removing mercury than the regenerated AW-500 molecular sieve of Run 3.

Example 3

Figure 3:
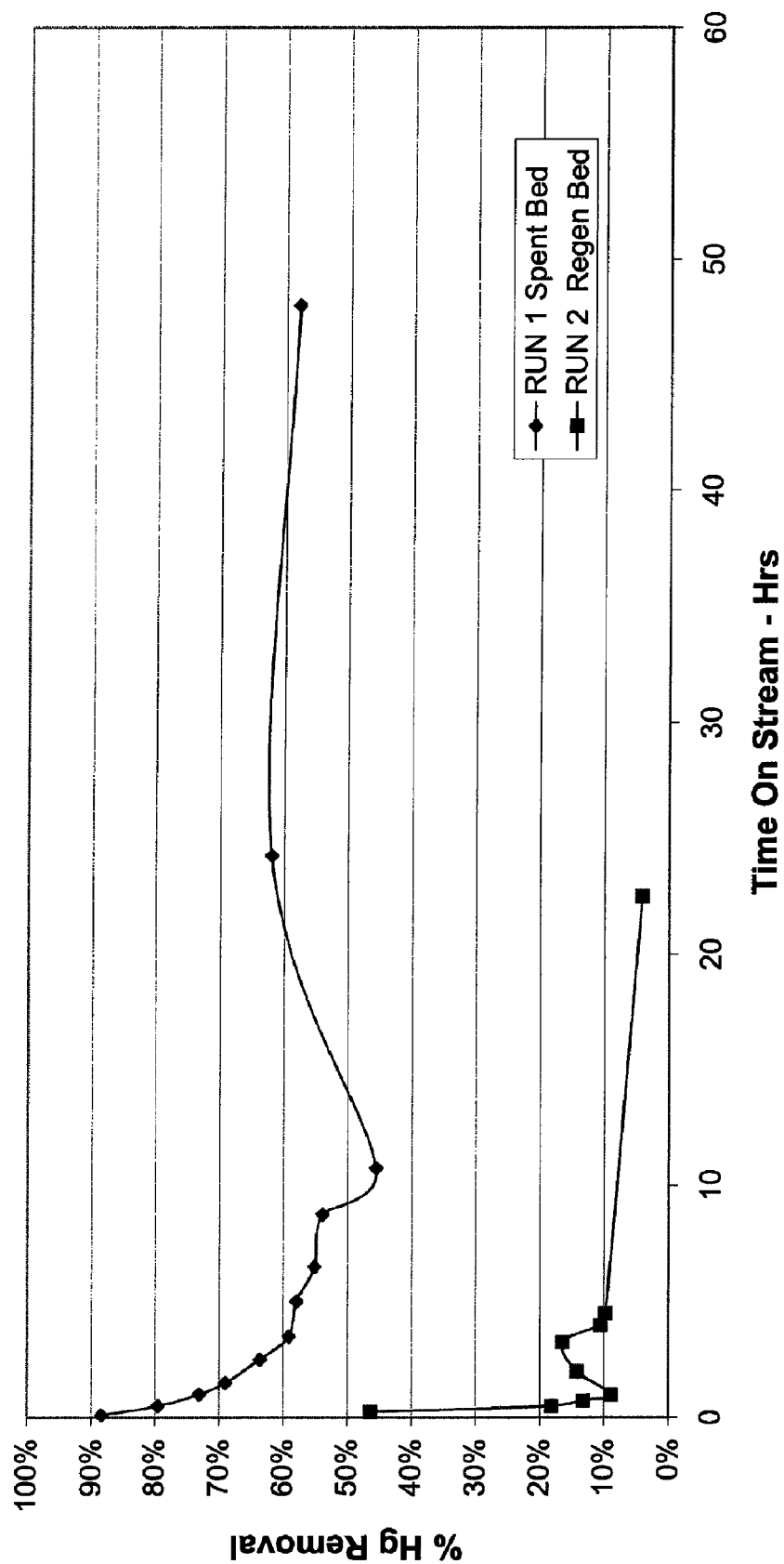
FIG. 3 is a graphic illustration of % Hg Removal vs. Time on Stream data for two runs wherein molecular sieve materials were used to remove $H_2S$ from natural gas.

Samples of AW-500 molecular sieve were taken from two different commercial beds at a gas plant. The beds were used to remove water, H₂S and some Hg from natural gas. Sample 1 was taken from a bed which had been fully loaded (to breakthrough) with H₂S. Sample 2 was taken from a bed which had just completed a regeneration cycle to remove water (and absorbed H₂S) and was ready to go back into service. For each of Runs 1 (Sample 1) and 2 (Sample 2), around 0.2 grams of the molecular sieve tested were loaded in the contactor, and a natural gas stream containing around 400 $\mu g/m^3$, and no H₂S, was passed over the material at around 72° F. Results from these runs are shown in FIG. 3 and demonstrate that the "spent" AW-500 molecular sieve (Run 1) was better at removing mercury than the "regenerated" AW-500 molecular sieve (Run 2) which contained less sulfur.

Whereas this invention has been described in terms of the preferred embodiments, reasonable variations and modifications are possible by those skilled in the art. Such modifications are within the scope of the described invention and appended claims.

What is claimed is:

1. A process comprising contacting a hydrocarbon gas stream comprising a heavy metal, which contains less than 10 ppm oxidizing compounds, with a composition comprising a molecular sieve and sulfur resulting in a treated stream containing less heavy metal than said hydrocarbon gas stream; wherein said molecular sieve comprises alumina, silica, and iron and said sulfur of said composition is in the form of iron sulfide formed by reacting a first sulfur compound selected from the group consisting of hydrogen sulfide, dimethyldisulfide, and combinations thereof with said iron contained in said molecular sieve.

2. The process of claim 1 wherein said hydrocarbon gas stream contains less than 5 ppm oxidizing compounds.

3. The process of claim 1 wherein said hydrocarbon gas stream contains less than 3 ppm oxidizing compounds.

4. The process of claim 1 wherein said molecular sieve is further characterized to comprise copper and zinc.

5. The process of claim 4 wherein said sulfur of said composition is in the form of the iron sulfide, copper sulfide and zinc sulfide formed by reacting the first sulfur compound with said iron, said copper and said zinc contained in said molecular sieve.

6. The process of claim 1 wherein said hydrocarbon gas stream comprises at least about 1 ppm of a second sulfur compound selected from the group consisting of hydrogen sulfide, dimethyldisulfide, and combinations thereof.

7. The process of claim 1 wherein said hydrocarbon gas stream comprises between about 2 ppm and about 20 ppm of a second sulfur compound selected from the group consisting of hydrogen sulfide, dimethyldisulfide, and combinations thereof.

8. The process of claim 1 wherein said hydrocarbon gas stream comprises between about 4 ppm and about 10 ppm of a second sulfur compound selected from the group consisting of hydrogen sulfide, dimethyldisulfide, and combinations thereof.

9. A process as recited in claim 1 wherein said contacting is carried out at a temperature in the range of from about 50 to about 150° F.

10. A process as recited in claim 1 wherein said contacting is carried out at a temperature in the range of from about 60 to about 120° F.

11. A process as recited in claim 1 wherein said contacting is carried out at a temperature in the range of from about 70 to about 110° F.

12. A process as recited in claim 1 wherein said heavy metal comprises a metal selected from the group consisting of arsenic, beryllium, lead, cadmium, chromium, nickel, zinc, mercury, barium, and combinations of any two or more thereof.

13. A process as recited in claim 1 wherein said heavy metal is mercury.

14. A process as recited in claim 13 wherein said mercury is present in said hydrocarbon gas stream in an amount in the range of from about 0.1 to about 10,000 $\mu g/m^3$.

15. A process as recited in claim 13 wherein said mercury is present in said hydrocarbon gas stream in an amount in the range of from about 1 to about 800 $\mu g/m^3$.

16. A process as recited in claim 13 wherein said mercury is present in said hydrocarbon gas stream in an amount in the range of from about 3 to about 700 $\mu g/m^3$.

17. A process as recited in claim 13 wherein said treated stream contains less than about 20 weight % of the mercury contained in said hydrocarbon gas stream.

18. A process as recited in claim 13 wherein said treated stream contains less than about 10 weight % of the mercury contained in said hydrocarbon gas stream.

19. A process as recited in claim 13 wherein said treated stream contains less than about 5 weight % of the mercury contained in said hydrocarbon gas stream.

* * * * *